United States Patent
Munoz, Jr.

(10) Patent No.: US 7,553,800 B2
(45) Date of Patent: Jun. 30, 2009

(54) IN-SITU FILTER CAKE DEGRADATION COMPOSITIONS AND METHODS OF USE IN SUBTERRANEAN FORMATIONS

(75) Inventor: Trinidad Munoz, Jr., Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 367 days.

(21) Appl. No.: 10/991,248

(22) Filed: Nov. 17, 2004

(65) Prior Publication Data

US 2006/0105917 A1 May 18, 2006

(51) Int. Cl.
*C09K 8/10* (2006.01)
*E21B 43/22* (2006.01)

(52) U.S. Cl. .............. 507/114; 166/244.1; 166/268; 166/270; 507/110; 507/112; 507/128

(58) Field of Classification Search ............. 507/110, 507/112, 114; 166/244.1, 268, 270
See application file for complete search history.

(56) References Cited

U.S. PATENT DOCUMENTS

| | | | |
|---|---|---|---|
| 2,238,671 A | 4/1941 | Woodhouse ............. 166/21 |
| 2,703,316 A | 3/1955 | Palmer ................ 260/78.3 |
| 3,173,484 A | 3/1965 | Huitt et al. ............. 166/280.1 |
| 3,195,635 A | 7/1965 | Fast .................. 166/280.1 |
| 3,272,650 A | 9/1966 | MacVittie ............... 134/7 |
| 3,302,719 A | 2/1967 | Fischer ................ 166/280.2 |
| 3,364,995 A | 1/1968 | Atkins et al. ............. 166/280.1 |
| 3,366,178 A | 1/1968 | Malone et al. ........... 166/280.1 |
| 3,455,390 A | 7/1969 | Gallus .................. 166/295 |
| 3,784,585 A | 1/1974 | Schmitt et al. ............ 260/861 |
| 3,819,525 A | 6/1974 | Hattenbrun ............. 252/132 |
| 3,828,854 A | 8/1974 | Templeton et al. ......... 166/307 |
| 3,836,465 A | 9/1974 | Rhudy et al. |
| 3,868,998 A | 3/1975 | Lybarger et al. ........... 166/278 |
| 3,912,692 A | 10/1975 | Casey et al. ............. 260/78.3 |
| 3,948,672 A | 4/1976 | Harnsberger ............. 106/90 |
| 3,955,993 A | 5/1976 | Curtice et al. ............ 106/90 |
| 3,960,736 A | 6/1976 | Free et al. .............. 252/8.55 R |
| 3,968,840 A | 7/1976 | Tate .................. 166/280.1 |
| 3,986,355 A | 10/1976 | Klaeger |
| 3,998,272 A | 12/1976 | Maly .................. 166/281 |
| 3,998,744 A | 12/1976 | Arnold et al. ............. 507/269 |
| 4,010,071 A | 3/1977 | Colegrove |
| 4,068,718 A | 1/1978 | Cooke, Jr. et al. ......... 166/280.2 |
| 4,169,798 A | 10/1979 | DeMartino ............. 252/8.55 R |
| 4,172,066 A | 10/1979 | Zweigle et al. .......... 260/29.6 TA |
| 4,261,421 A | 4/1981 | Watanabe ............... 166/281 |
| 4,265,673 A | 5/1981 | Pace et al. |
| 4,299,825 A | 11/1981 | Lee |
| 4,387,769 A | 6/1983 | Erbstoesser et al. ......... 166/295 |
| 4,460,052 A | 7/1984 | Gockel .................. 175/72 |
| 4,470,915 A | 9/1984 | Conway ............... 252/8.55 R |
| 4,498,995 A | 2/1985 | Gockel ................ 252/8.5 LC |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. ....... 252/8.55 R |
| 4,632,876 A | 12/1986 | Laird et al. |
| 4,652,384 A | 3/1987 | Francis et al. |
| 4,694,905 A | 9/1987 | Armbruster .............. 166/280 |
| 4,715,967 A | 12/1987 | Bellis et al. ............. 252/8.551 |
| 4,716,964 A | 1/1988 | Erbstoesser et al. ........ 166/284 |
| 4,767,706 A * | 8/1988 | Levesque et al. .......... 435/176 |
| 4,772,346 A | 9/1988 | Anderson et al. |
| 4,785,884 A | 11/1988 | Armbruster .............. 166/280 |
| 4,793,416 A | 12/1988 | Mitchell |
| 4,797,262 A | 1/1989 | Dewitz ................. 422/142 |
| 4,809,783 A | 3/1989 | Hollenbeck et al. ........ 166/307 |
| 4,817,721 A | 4/1989 | Pober .................. 166/295 |
| 4,822,500 A | 4/1989 | Dobson, Jr. et al. |
| 4,829,100 A | 5/1989 | Murphey et al. |

(Continued)

FOREIGN PATENT DOCUMENTS

EP 0 510 762 A2 4/1992

(Continued)

OTHER PUBLICATIONS

Simmons, et al., *Poly(phenyllactide): Synthesis, Characterization, and Hydrolytic Degradation*, Biomacromolecules, vol. 2, No. 2, 2001 (pp. 658-663).

(Continued)

*Primary Examiner*—Timothy J Kugel
(74) *Attorney, Agent, or Firm*—Robert A. Kent; Baker Botts LLP

(57) ABSTRACT

Improved in-situ filter cake degradation compositions for use in subterranean formations, well drill-in and servicing fluids including such in-situ filter cake degradation compositions, and methods of using such in-situ filter cake degradation compositions and well drill-in and servicing fluids in subterranean operations are provided. An example of a method is a method for forming a self-degrading filter cake in a subterranean formation. Another example of a method is a method of drilling a well bore in a subterranean formation. Another example of a method is a method of degrading a filter cake in a subterranean formation. An example of a composition is a well drill-in and servicing fluid. Another example of a composition is an in-situ filter cake degradation composition.

47 Claims, No Drawings

U.S. PATENT DOCUMENTS

| | | | |
|---|---|---|---|
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,863,980 A | 9/1989 | Cowan et al. | |
| 4,886,354 A | 12/1989 | Welch et al. | 356/70 |
| 4,894,231 A | 1/1990 | Moreau et al. | |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | |
| 5,044,992 A | 9/1991 | Dzwonczyk et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,251,697 A | 10/1993 | Shuler | |
| 5,295,542 A | 3/1994 | Cole et al. | 166/278 |
| 5,304,620 A | 4/1994 | Holtmyer et al. | |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,783,527 A | 7/1998 | Dobson, Jr. et al. | |
| 5,791,415 A | 8/1998 | Nguyen et al. | 166/280 |
| 5,799,734 A | 9/1998 | Norman et al. | |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,916,849 A | 6/1999 | House | |
| 5,924,488 A | 7/1999 | Nguyen et al. | 166/280 |
| 5,964,291 A | 10/1999 | Bourne et al. | 166/279 |
| 5,977,030 A | 11/1999 | House | |
| 5,979,557 A | 11/1999 | Card et al. | |
| 5,981,447 A | 11/1999 | Chang et al. | |
| 5,996,693 A | 12/1999 | Heathman | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,180,571 B1 | 1/2001 | Sifferman et al. | |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,291,013 B1 | 9/2001 | Gibson et al. | |
| 6,294,920 B1 | 9/2001 | Pfaff | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | 166/280 |
| 6,315,576 B1 | 11/2001 | Neidich | |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,917 B2 | 12/2001 | Chatterji et al. | |
| 6,345,987 B1 | 2/2002 | Mori et al. | |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,394,819 B1 | 5/2002 | Mosser, III et al. | |
| 6,409,521 B1 | 6/2002 | Rathburn | |
| 6,422,314 B1 | 7/2002 | Todd et al. | 166/312 |
| 6,422,326 B1 | 7/2002 | Brookey et al. | |
| 6,432,155 B1 | 8/2002 | Swazey et al. | |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer et al. | |
| 6,527,051 B1 | 3/2003 | Reddy et al. | 166/300 |
| 6,554,071 B1 | 4/2003 | Crook et al. | 166/293 |
| 6,566,310 B2 | 5/2003 | Chan | |
| 6,569,814 B1 | 5/2003 | Brady et al. | 507/201 |
| 6,578,630 B2 | 6/2003 | Simpson et al. | |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,691,780 B2 | 2/2004 | Nguyen et al. | |
| 6,702,023 B1 | 3/2004 | Harris et al. | 166/307 |
| 6,710,019 B1 | 3/2004 | Sawdon et al. | 507/136 |
| 6,716,797 B2 | 4/2004 | Brookey | |
| 6,737,385 B2 | 5/2004 | Todd et al. | |
| 6,761,218 B2 | 7/2004 | Nguyen et al. | 166/278 |

| | | |
|---|---|---|
| 6,763,888 B1 | 7/2004 | Harris et al. .............. 166/276 |
| 6,764,981 B1 | 7/2004 | Eoff et al. |
| 6,793,018 B2 | 9/2004 | Dawson et al. |
| 6,793,730 B2 | 9/2004 | Reddy et al. |
| 6,806,235 B1 | 10/2004 | Mueller et al. |
| 6,817,414 B2 | 11/2004 | Lee .............. 166/278 |
| 6,818,594 B1 | 11/2004 | Freeman et al. |
| 6,837,309 B2 | 1/2005 | Boney et al. .............. 166/280.2 |
| 6,883,608 B2 | 4/2005 | Parlar et al. |
| 6,896,058 B2 | 5/2005 | Munoz, Jr. et al. .......... 166/279 |
| 6,904,971 B2 | 6/2005 | Brothers et al. |
| 6,949,491 B2 | 9/2005 | Cooke, Jr. .............. 507/219 |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,801 B2 | 1/2006 | Dawson et al. |
| 6,987,083 B2 | 1/2006 | Phillippi et al. |
| 6,997,259 B2 | 2/2006 | Nguyen |
| 7,007,752 B2 | 3/2006 | Reddy et al. |
| 7,021,377 B2 | 4/2006 | Todd et al. |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,063,151 B2 | 6/2006 | Nguyen et al. |
| 7,066,258 B2 | 6/2006 | Justus et al. |
| 7,069,994 B2 | 7/2006 | Cooke, Jr. |
| 7,080,688 B2 | 7/2006 | Todd et al. ............... 166/278 |
| 7,093,664 B2 | 8/2006 | Todd et al. |
| 7,096,947 B2 | 8/2006 | Todd et al. |
| 7,101,829 B2 | 9/2006 | Guichard et al. |
| 7,131,491 B2 | 11/2006 | Blauch et al. |
| 7,140,438 B2 | 11/2006 | Frost et al. |
| 7,147,067 B2 | 12/2006 | Getzlaf et al. |
| 7,151,077 B2 * | 12/2006 | Prud'homme et al. ....... 507/219 |
| 7,156,174 B2 | 1/2007 | Roddy et al. |
| 7,165,617 B2 * | 1/2007 | Lord et al. .............. 166/308.5 |
| 7,168,489 B2 | 1/2007 | Frost et al. |
| 7,172,022 B2 | 2/2007 | Reddy et al. |
| 7,178,596 B2 | 2/2007 | Blauch et al. ............ 166/280 |
| 7,195,068 B2 | 3/2007 | Todd |
| 7,204,312 B2 | 4/2007 | Roddy et al. |
| 7,219,731 B2 | 5/2007 | Sullivan et al. ............ 166/278 |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 9,299,876 | 11/2007 | Lord et al. |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 7,353,876 B2 | 4/2008 | Savery et al. |
| 7,353,879 B2 | 4/2008 | Todd et al. |
| 7,448,450 B2 | 11/2008 | Luke et al. |
| 7,497,278 B2 | 3/2009 | Schriener et al. |
| 2001/0016562 A1 | 8/2001 | Muir et al. ............... 507/201 |
| 2002/0036088 A1 | 3/2002 | Todd .............. 166/300 |
| 2002/0119169 A1 | 8/2002 | Angel et al. |
| 2002/0125012 A1 | 9/2002 | Dawson et al. ............ 166/300 |
| 2003/0054962 A1 | 3/2003 | England et al. |
| 2003/0060374 A1 | 3/2003 | Cooke, Jr. .............. 507/200 |
| 2003/0114314 A1 | 6/2003 | Ballard et al. ............ 507/100 |
| 2003/0130133 A1 | 7/2003 | Vollmer .............. 507/100 |
| 2003/0147965 A1 | 8/2003 | Bassett et al. |
| 2003/0166471 A1 | 9/2003 | Samuel et al. |
| 2003/0188766 A1 | 10/2003 | Banerjee et al. .............. 134/7 |
| 2003/0230407 A1 | 12/2003 | Vijn et al. |
| 2003/0234103 A1 | 12/2003 | Lee .............. 166/293 |
| 2004/0014606 A1 | 1/2004 | Parlar et al. |
| 2004/0014607 A1 | 1/2004 | Sinclair et al. ............ 507/200 |
| 2004/0040706 A1 | 3/2004 | Hossaini et al. ............ 166/278 |
| 2004/0055747 A1 | 3/2004 | Lee .............. 166/278 |
| 2004/0070093 A1 | 4/2004 | Mathiowitz et al. |
| 2004/0094300 A1 | 5/2004 | Sullivan et al. .......... 166/308.1 |
| 2004/0099416 A1 | 5/2004 | Vijn et al. |
| 2004/0106525 A1 | 6/2004 | Willberg et al. .............. 507/200 |
| 2004/0138068 A1 | 7/2004 | Rimmer et al. .............. 507/100 |
| 2004/0152601 A1 | 8/2004 | Still et al. .................. 507/100 |
| 2004/0152602 A1 | 8/2004 | Boles .................. 507/100 |
| 2004/0162386 A1 | 8/2004 | Altes et al. |
| 2004/0170836 A1 | 9/2004 | Bond et al. |
| 2004/0214724 A1 | 10/2004 | Todd et al. |
| 2004/0216876 A1 | 11/2004 | Lee .............. 166/280.1 |
| 2004/0231845 A1 | 11/2004 | Cooke, Jr. .............. 166/279 |
| 2004/0261993 A1 | 12/2004 | Nguyen .............. 166/276 |
| 2004/0261995 A1 | 12/2004 | Nguyen et al. .............. 166/279 |
| 2004/0261996 A1 | 12/2004 | Munoz, Jr. et al. .......... 166/279 |
| 2004/0261999 A1 | 12/2004 | Nguyen .............. 166/292 |
| 2005/0006095 A1 | 1/2005 | Justus et al. .............. 166/295 |
| 2005/0028976 A1 | 2/2005 | Nguyen .............. 166/276 |
| 2005/0034861 A1 * | 2/2005 | Saini et al. .............. 166/278 |
| 2005/0034865 A1 | 2/2005 | Todd et al. .............. 166/304 |
| 2005/0034868 A1 | 2/2005 | Frost et al. .............. 166/307 |
| 2005/0045328 A1 | 3/2005 | Frost et al. |
| 2005/0059556 A1 | 3/2005 | Munoz, Jr. et al. |
| 2005/0059557 A1 | 3/2005 | Todd et al. |
| 2005/0059558 A1 | 3/2005 | Blauch et al. |
| 2005/0103496 A1 | 5/2005 | Todd et al. .............. 166/278 |
| 2005/0126785 A1 * | 6/2005 | Todd .............. 166/307 |
| 2005/0130848 A1 | 6/2005 | Todd et al. |
| 2005/0183741 A1 | 8/2005 | Surjaatmadja et al. |
| 2005/0205266 A1 | 9/2005 | Todd et al. |
| 2005/0252659 A1 | 11/2005 | Sullivan et al. .......... 166/280.1 |
| 2005/0272613 A1 | 12/2005 | Cooke, Jr. .............. 507/219 |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. .............. 507/103 |
| 2006/0105918 A1 * | 5/2006 | Munoz .............. 507/203 |
| 2006/0172893 A1 | 8/2006 | Todd et al. |
| 2006/0283597 A1 | 12/2006 | Schriener et al. ............ 166/300 |
| 2007/0049501 A1 | 3/2007 | Saini et al. |
| 2007/0235190 A1 * | 10/2007 | Lord et al. .............. 166/280.2 |
| 2008/0070810 A1 | 3/2008 | Mang |

FOREIGN PATENT DOCUMENTS

| | | |
|---|---|---|
| EP | 0571879 | 12/1993 |
| EP | 0 672 740 A1 | 3/1995 |
| EP | 0 672 740 A1 | 9/1995 |
| EP | 0 879 935 A2 | 11/1998 |
| EP | 0 879 935 A3 | 10/1999 |
| EP | 1 413 710 A1 | 4/2004 |
| GB | 2274212 | 7/1994 |
| JP | 2004181820 A | 7/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/055843 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 | 5/2004 |

| | | | |
|---|---|---|---|
| WO | WO 2004/038176 A1 | 5/2004 | |
| WO | WO2005/066451 A1 | 7/2005 | |
| WO | WO2007/026144 A1 | 3/2007 | |

OTHER PUBLICATIONS

Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selective Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Synthesis, Properties and Applications*, Advances in Polymer Science, vol. 157, 2002.
Dechy-Caberet, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
Chelating Agents, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost Effective Method for Stimulating Untapped Reserves*, HO2319R, Halliburton Energy Services, 2000.
Halliburton, *CobraJet Frac$^{SM}$Service, Cost-effective Technology That Can Help Reduce Cost Per BOE Produced, Shorten Cycle Time and Reduce Capex*, Halliburton Communications.
Blauch, et al, *Aqueous Tackifier and Methods of Controlling Particulates*, U.S. Appl. No. 10/864,061, filed Jun. 9, 2004.
Blauch, et al, *Aqueous-Based Tackifier Fluids and Methods of Use*, U.S. Appl. No. 10/864,618, filed Jun. 9, 2004.
U.S. Appl. No. 10/650,101, filed Aug. 26, 2003, Todd, et al.
U.S. Appl. No. 10/655,883, filed Sep. 5, 2003, Nguyen et al.
U.S. Appl. No. 10/661,173, filed Aug. 11, 2003, Todd, et al.
U.S. Appl. No. 10/664,126, filed Sep. 17, 2003, Todd, et al.
U.S. Appl. No. 10/736,152, filed Dec. 15, 2003, Todd.
U.S. Appl. No. 10/765,334, filed Jan. 27, 2004, Todd, et al.
U.S. Appl. No. 10/768,323, filed Jan. 30, 2004, Roddy, et al.
U.S. Appl. No. 10/768,864, filed Jan. 30, 2004, Roddy, et al.
U.S. Appl. No. 10/769,490, filed Jan. 30, 2004, Roddy, et al.
U.S. Appl. No. 10/783,207, filed Feb. 20, 2004, Surjaatmadja, et al.
U.S. Appl. No. 10/785,300, filed Feb. 24, 2004, Frost, et al.
U.S. Appl. No. 10/802,340, filed Mar. 17, 2004, Reddy, et al.
U.S. Appl. No. 10/803,668, filed Mar. 17, 2004, Todd, et al.
U.S. Appl. No. 10/803,689, filed Mar. 18, 2004, Todd, et al.
U.S. Appl. No. 10/832,163, filed Apr. 26, 2004, Munoz, Jr., et al.
U.S. Appl. No. 10/897,509, filed Jul. 23, 2004, Pauls, et al.
U.S. Appl. No. 10/915,024, filed Aug. 10, 2004, Nguyen.
U.S. Appl. No. 10/932,749, filed Sep. 2, 2004, Harris, et al.
U.S. Appl. No. 10/933,705, filed Sep. 3, 2004, Kalman.
U.S. Appl. No. 10/947,427, filed Sep. 20, 2004, Blauch, et al.
U.S. Appl. No. 10/950,072, filed Sep. 24, 2004, Nguyen, et al.
U.S. Appl. No. 10/991,228, filed Nov. 17, 2004, Munoz, Jr., et al.
Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: Ortho Ester Hydrolysis: Direct Evidence for a Three-Stage Reaction Mechanism, Engineering Information Inc., NY, NY, vol. 101, No. 10 (XP-002322843), May 9, 1979.
Skrabal et al., *The Hydrolysis Rate of Orthoformic Acid Ethyl Ether*, Chemical Institute of the University of Graz, pp. 1-38, Jan. 13, 1921.
Heller, et al., *Poly(ortho esters)—From Concept To Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho ester); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46).
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).
Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemical "Trigger" Useful For Oilfield Applications*, Society of Petroleum Engineers, Inc., SPE 92709, Feb. 4, 2005.
Written Opinion and Search Report for Application No. PCT/GB2005/004379, Mar. 24, 2006.
Foreign communication related to a counterpart application dated Mar. 24, 2006.
Kiyoshi Matsuyama et al, Environmentally benign formation of polymeric microspheres by rapid expansion of supercritical carbon dioxide solution with a nonsolvent, Environ Sci Technol2001, 35, 4149-4155.
Office Action dated Feb. 1, 2008 from U.S. Appl. No. 10/991,228.
Office Action dated Oct. 24, 2007 from U.S. Appl. No. 10/991,228.
Office Action dated Jun. 15, 2007 from U.S. Appl. No. 10/991,228.
Office Action Mailed Feb. 1, 2008 from U.S. Appl. No. 10/991,228.
Office Action Mailed Jul. 23, 2008 from U.S. Appl. No. 10/991,228.
Office Action for U.S. Appl. No. 10/991,228, mailed Mar. 9, 2009.
Office Action for U.S. Appl. No. 11/217,955 dated Jul. 1, 2008.
Office Action for U.S. Appl. No. 11/217,955 dated Dec. 24, 2008.
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.

* cited by examiner

IN-SITU FILTER CAKE DEGRADATION COMPOSITIONS AND METHODS OF USE IN SUBTERRANEAN FORMATIONS

BACKGROUND

The present invention relates to improved in-situ filter cake degradation compositions for use in subterranean formations, to well drill-in and servicing fluids comprising such in-situ filter cake degradation compositions, and to methods of using such in-situ filter cake degradation compositions and well drill-in and servicing fluids in subterranean operations.

Often, once drilling of a well bore in a subterranean formation has been initiated, a fluid referred to as a "well drill-in and servicing fluid" may be employed. As referred to herein, the term "well drill-in and servicing fluid" will be understood to mean a fluid placed in a subterranean formation, such as one from which production has been, is being, or may be cultivated. For example, an operator may begin drilling a subterranean borehole using a drilling fluid, cease drilling at a depth just above that of a productive formation, circulate a sufficient quantity of a well drill-in and servicing fluid through the bore hole to completely flush out the drilling fluid, then proceed to drill into the desired formation using the well drill-in and servicing fluid. Well drill-in and servicing fluids often may be utilized, inter alia, to minimize damage to the permeability of such formations.

Well drill-in and servicing fluids may include "fluid-loss-control fluids." As referred to herein, the term "fluid-loss-control fluid" will be understood to mean a fluid designed to form a filter cake onto a screen or gravel pack, or in some cases, directly onto the formation. For example, a fluid-loss-control fluid may comprise a comparatively small volume of fluid designed to form a filter cake so as to plug off a "thief zone" (e.g., a formation, most commonly encountered during drilling operations, into which the drilling fluid may be lost). Generally, well drill-in and servicing fluids are designed to form a fast and efficient filter cake on the walls of a well bore within a producing formation to minimize leak-off and damage. The filter cake often comprises an inorganic portion (e.g., calcium carbonate), and an organic portion (e.g., starch and xanthan). The filter cake generally is removed before hydrocarbons from the formation are produced. Conventional methods of removal have involved contacting the filter cake with one or more subsequent fluids.

Other conventional methods of removing the filter cake include formulating the well drill-in and servicing fluid so as to include an acid-soluble particulate solid bridging agent. The resultant filter cake formed by such well drill-in and servicing fluid then is contacted with a strong acid to ultimately dissolve the bridging agent. This method is problematic, however, because the strong acid often corrodes metallic surfaces of completion equipment (e.g., sand control screens), thereby causing such equipment to prematurely fail. Further, the strong acid may damage the producing formation. Additionally, the strong acid may cause the bridging agent to dissolve prematurely, resulting in the loss of the strong acid into the formation, before it can completely cover the filter cake.

Another method of filter cake removal has involved the use of a water-soluble particulate solid bridging agent in the well drill-in and servicing fluid, which bridging agent subsequently is contacted with an aqueous salt solution that is undersaturated with respect to such bridging agent. This method is problematic, however, because such bridging agents may require a relatively long period of time to dissolve in the aqueous salt solution, due to, inter alia, the presence of various gelling agents in the well drill-in and servicing fluids. Such gelling agents may prevent the aqueous salt solution from contacting the water-soluble bridging agents.

Operators also have attempted to remove the filter cake by contacting it with a combination of an acid and an oxidizer. The acid may be used to degrade the inorganic portion of the filter cake, while the oxidizer may be employed to degrade the organic portion. However, this may be unnecessarily expensive, as it involves placement of additional components into the formation, at additional cost. For example, operators have attempted to remove the filter cake by flowing a solution comprising hydrogen peroxide into the well bore and permitting it to contact the filter cake. This may be problematic, however, as the transportation, storage, and handling of hydrogen peroxide may present safety concerns.

SUMMARY

The present invention relates to improved in-situ filter cake degradation compositions for use in subterranean formations, to well drill-in and servicing fluids comprising such in-situ filter cake degradation compositions, and to methods of using such in-situ filter cake degradation compositions and well drill-in and servicing fluids in subterranean operations.

An example of a method of the present invention is a method for forming a self-degrading filter cake in a subterranean formation, comprising: placing a well drill-in and servicing fluid in a subterranean formation, the well drill-in and servicing fluid comprising a base fluid, a viscosifier, a fluid loss control additive, a bridging agent, and an in-situ filter cake degradation composition comprising a delayed-release acid component and an initiator component; and forming a filter cake upon a surface within the formation. For example, the surface within the formation may be, inter alia, a well bore wall, or a screen, or a gravel pack.

Another example of a method of the present invention is a method of drilling a well bore in a subterranean formation, comprising; using a well drill-in and servicing fluid to drill a well bore in a subterranean formation, the well drill-in and servicing fluid comprising a base fluid, a viscosifier, a fluid loss control additive, a bridging agent, and an in-situ filter cake degradation composition comprising a delayed-release acid component and an initiator component; permitting the well drill-in and servicing fluid to establish a filter cake in at least a portion of the well bore; and permitting the filter cake to degrade.

Another example of a method of the present invention is a method of degrading a filter cake in a subterranean formation, the filter cake comprising an inorganic portion and an organic portion, the method comprising: introducing an in-situ filter cake degradation composition comprising a delayed-release acid component and an initiator component into a well bore in the subterranean formation; allowing the delayed-release acid component to release an acid; allowing the initiator component to interact with the released acid to produce an oxidizer; allowing the released acid to degrade at least a portion of the inorganic portion of the filter cake; and allowing the oxidizer to degrade at least a portion of the organic portion of the filter cake.

An example of a composition of the present invention is a well drill-in and servicing fluid comprising: a base fluid; a viscosifier; a fluid loss control additive; a bridging agent; and an in situ filter cake degradation composition comprising a delayed-release acid component and an initiator component.

Another example of a composition of the present invention is an in situ filter cake degradation composition comprising a delayed-release acid component and an initiator component.

The features and advantages of the present invention will be readily apparent to those skilled in the art upon a reading of the description of the embodiments which follows.

DETAILED DESCRIPTION

The present invention relates to improved in-situ filter cake degradation compositions for use in subterranean formations, to well drill-in and servicing fluids comprising such in-situ filter cake degradation compositions, and to methods of using such in-situ filter cake degradation compositions and well drill-in and servicing fluids in subterranean operations.

The well drill-in and servicing fluids of the present invention generally comprise a base fluid, a viscosifier, a fluid loss control additive, a bridging agent, and an in-situ filter cake degradation composition that comprises a delayed-release acid component and an initiator component.

The base fluid utilized in the well drill-in and servicing fluids of the present invention may be aqueous-based, non-aqueous-based, or mixtures thereof. Where the base fluid is aqueous-based, the base fluid may comprise fresh water, salt water (e.g., water containing one or more salts dissolved therein), brine (e.g., saturated salt water), or seawater. Generally, the water can be from any source provided that it does not contain an excess of compounds that may adversely affect other components in the well drill-in and servicing fluid. Where the base fluid is non-aqueous-based, the base fluid may comprise any number of organic fluids. Examples of suitable organic fluids include, but are not limited to, mineral oils, synthetic oils, esters, and the like, and derivatives thereof. Generally, these organic fluids may be referred to generically as "oils." Generally, any oil in which a water solution of salts can be emulsified may be suitable for use as a non-aqueous-based base fluid in the well drill-in and servicing fluids of the present invention. Generally, the base fluid may be present in an amount sufficient to form a pumpable well drill-in and servicing fluid. More particularly, the base fluid typically is present in the well drill-in and servicing fluids of the present invention in an amount in the range of from about 20% to about 99.99% by volume of the well drill-in and servicing fluid.

The well drill-in and servicing fluids of the present invention further comprise a viscosifier. Examples of suitable viscosifiers include, inter alia, biopolymers (e.g., xanthan and succinoglycan), cellulose and cellulose derivatives (e.g., hydroxyethylcellulose), guar, and guar derivatives (e.g., hydroxypropyl guar). In certain embodiments of the present invention, the viscosifier is guar. Commercially available examples of suitable viscosifiers include, but are not limited to, those that are available from Halliburton Energy Services, of Duncan, Okla., under the trade name "N-VIS." Generally, the viscosifier is present in the well drill-in and servicing fluids of the present invention in an amount sufficient to provide a desired degree of solids suspension. More particularly, the viscosifier may be present in the well drill-in and servicing fluids of the present invention in an amount in the range of from about 0.01% to about 1.0% by weight. In certain embodiments of the present invention, the viscosifier is present in the well drill-in and servicing fluids of the present invention in an amount in the range of from about 0.2% to about 0.6% by weight.

The well drill-in and servicing fluids of the present invention further comprise a fluid loss control additive. A variety of fluid loss control additives can be included in the well drill-in and servicing fluids of the present invention, including, inter alia, polysaccharides and derivatives thereof. Examples of suitable fluid loss control additives include, inter alia, starch, starch ether derivatives, hydroxyethylcellulose, cross-linked hydroxyethylcellulose, and mixtures thereof. In certain embodiments of the present invention, the fluid loss control additive is starch. Commercially available examples of suitable fluid loss control additives include, but are not limited to, those that are available from Halliburton Energy Services, of Duncan, Okla., under the trade name "N-Dril HT Plus." The fluid loss control additive is present in the well drill-in and servicing fluids of the present invention in an amount sufficient to provide a desired degree of fluid loss control. More particularly, the fluid loss control additive may be present in the well drill-in and servicing fluids of the present invention in an amount in the range of from about 0.01% to about 3% by weight. In certain embodiments of the present invention, the fluid loss control additive is present in the well drill-in and servicing fluids of the present invention in an amount in the range of from about 1% to about 2% by weight.

The well drill-in and servicing fluids of the present invention further comprise a bridging agent. The well drill-in and servicing fluids of the present invention suspend the bridging agent and, as the well drill-in and servicing fluid begins to form a filter cake within the subterranean formation, the bridging agent becomes distributed throughout the resulting filter cake, most preferably uniformly. In certain embodiments of the present invention, the filter cake may form upon the face of the formation itself, upon a sand screen, or upon a gravel pack. In certain embodiments of the present invention, the bridging agent comprises, inter alia, calcium carbonate, a magnesium compound (e.g., magnesium oxide), or a chemically bonded ceramic bridging agent, or derivatives thereof. Generally, the bridging agent is present in the well drill-in and servicing fluids of the present invention in an amount sufficient to create an efficient filter cake. As referred to herein, the term "efficient filter cake" will be understood to mean a filter cake comprising no material beyond that required to provide a desired level of fluid loss control. In certain embodiments of the present invention, the bridging agent is present in the well drill-in and servicing fluids of the present invention in an amount ranging from about 0.1% to about 32% by weight. In certain embodiments of the present invention, the bridging agent is present in the well drill-in and servicing fluids of the present invention in the range of from about 3% and about 10% by weight. In certain embodiments of the present invention, the bridging agent is present in the well drill-in and servicing fluids of the present invention in an amount sufficient to provide a fluid loss of less than about 15 mL in tests conducted according to the procedures set forth by API Recommended Practice (RP) 13

The well drill-in and servicing fluids of the present invention further comprise an in-situ filter cake degradation composition that comprises a delayed-release acid component and an initiator component. When the well drill-in and servicing fluids of the present invention have been formulated and placed within the subterranean formation, the delayed-release acid component releases an acid (e.g., lactic acid), as illustrated in Equation 1 below:

EQUATION 1:

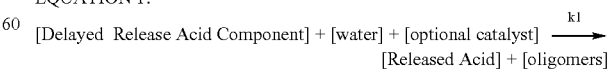

[Delayed Release Acid Component] + [water] + [optional catalyst] $\xrightarrow{k1}$ [Released Acid] + [oligomers]

The optional catalyst may be present in the well drill-in and servicing fluids of the present invention, or may be placed in the well bore separately. The optional catalyst may comprise an acid, or a base. One of ordinary skill in the art, with the benefit of this disclosure, will recognize when the use of an optional catalyst may be appropriate for a particular application, and whether such optional catalyst should comprise an acid or a base.

The released acid reacts with the initiator component to produce an oxidizer, as illustrated in Equation 2 below:

EQUATION 2:

[Released Acid] + [Initiator Component] $\xrightarrow{k2}$ [Oxidizer]

In certain embodiments of the present invention, the oxidizer produced may be, inter alia, hydrogen peroxide. In certain embodiments of the present invention, one or more byproducts may be produced by the reaction between the released acid and the initiator component. For example, when the released acid comprises lactic acid, and the initiator component comprises lactate oxidase, the reaction between lactic acid and lactate oxidase may produce an oxidizer (e.g., hydrogen peroxide) and a byproduct (e.g., pyruvic acid). Accordingly, the compositions and methods of the present invention are capable of producing an oxidizer while within the subterranean formation, thereby eliminating or reducing certain safety concerns that may be present in conventional operations, e.g., safety concerns that accompany the storage, transportation, and handling of oxidizers that are injected into the formation from the surface.

In addition to reacting with the initiator, the released acid also may react with the inorganic portion of the filter cake, as illustrated in Equation 3 below:

EQUATION 3:

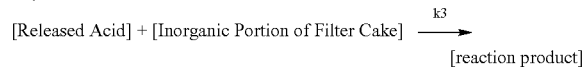

[Released Acid] + [Inorganic Portion of Filter Cake] $\xrightarrow{k3}$

[reaction product]

For example, where the inorganic portion of the filter cake comprises calcium carbonate, and where the released acid comprises lactic acid, the reaction product may comprise calcium lactate. As another example, where the inorganic portion of the filter cake comprises magnesium oxide, and where the released acid comprises lactic acid, the reaction product may comprise magnesium lactate.

The rate at which the released acid is released by the delayed-release acid component, "k1," inter alia, may largely determine the total degradation time of the inorganic portion of the filter cake (though, as will be described below with reference to "k2," the total degradation time of the inorganic portion of the filter cake may be delayed, inter alia, by the presence and concentration of an initiator component). Generally, k1 depends on factors such as, inter alia, the time during which water and the delayed release acid component are permitted to contact each other, the amount of water that is available to react with the delayed release acid component, temperature, and the presence or absence of the optional catalyst. Generally, both acid catalysts and base catalysts may be used to increase k1. In certain embodiments of the present invention, the reaction depicted in Equation 1 may be base-catalyzed, and caustic may be used as the optional catalyst.

The reaction rate between the initiator component and the released acid, "k2," inter alia, determines the extent to which the reaction between the released acid and the inorganic portion of the filter cake may be delayed. Furthermore, the oxidizer produced by the reaction of the released acid with the initiator may degrade the organic portions of a filter cake that has been established in a subterranean formation by the well drill-in and servicing fluid. In certain embodiments of the present invention, k2 may be increased by permitting the reaction to occur in the presence of an oxygen source (e.g., by bubbling oxygen into the region of the subterranean formation where the reaction is occurring). In certain embodiments of the present invention, k2 may be decreased by the placement of a temporary physical barrier between the initiator component and the released acid, e.g., by encapsulating the initiator component in a suitable encapsulant, which encapsulant may be selected to degrade within the subterranean formation at a desired time. Examples of suitable encapsulants for the initiator component may include, inter alia, fatty acids, and the like.

Generally, the in-situ filter cake degradation composition is present in the well drill-in and servicing fluids of the present invention in an amount sufficient to remove such filter cake to a desired degree. In certain embodiments of the present invention, the in-situ filter cake degradation composition is present in the well drill-in and servicing fluid in an amount ranging from about 10% to about 25% by weight. In certain embodiments of the present invention, the in-situ filter cake degradation composition is present in the well drill-in and servicing fluid in the range of from about 15% and about 20% by weight.

The delayed-release acid components of the in-situ filter cake degradation compositions of the present invention comprise an acid derivative. Examples of suitable acid derivatives include, but are not limited to: esters, such as ortho esters; poly(ortho esters); aliphatic polyesters; lactides, poly(lactides); glycolides; poly(glycolides); lactones; poly(ε-caprolactones); poly(hydroxybutyrates); anhydrides; poly(anhydrides); and poly(amino acids), and derivatives thereof. If desired, the delayed-release acid components also may comprise an esterase enzyme (e.g., proteinase-K), or a derivative thereof. In certain embodiments of the present invention, the esterase enzyme or its derivative may be encapsulated by means known in the art. Blends of certain acid-releasing degradable materials also may be suitable. One example of a suitable blend of materials includes a blend of a poly(lactic acid) and an ortho ester. It is within the ability of one skilled in the art, with the benefit of this disclosure, to select a suitable acid-releasing degradable material. When used in the present invention, a desirable result may be achieved if the acid-releasing degradable material degrades slowly over time, as opposed to instantaneously.

In certain embodiments of the present invention, the delayed-release acid components of the in-situ filter cake degradation compositions of the present invention may comprise a mixture of an acid derivative and a hydrated organic or inorganic solid compound. For example, in circumstances wherein an insufficient amount of water is present in the subterranean formation to facilitate the degradation of the acid derivative, a desirable choice for a delayed-release acid component may be a mixture of an acid derivative and a hydrated organic or inorganic solid compound. In an embodiment of the present invention, the acid derivative may degrade in the water provided by the hydrated organic or inorganic compound, which dehydrates over time when heated in the subterranean zone. Examples of such hydrated organic or inorganic compounds may include, but are not limited to: sodium acetate trihydrate; L-tartaric acid disodium salt dihydrate; sodium citrate dihydrate; sodium tetraborate decahydrate; sodium hydrogen phosphate heptahydrate; sodium phosphate dodecahydrate; amylose; starch-based hydrophilic polymers; or cellulose-based hydrophilic polymers.

The delayed-release acid component generally may be present in the in-situ filter cake degradation compositions of the present invention in an amount sufficient to release a desired amount of acid. In certain embodiments of the present invention, the desired amount of acid that will be released is an amount that will: (1) react with the initiator component of the in-situ filter cake degradation composition to produce a desired amount of an oxidizer; and (2) degrade at least a portion of the inorganic component of the filter cake. In certain embodiments, the delayed-release acid component may be present in the in-situ filter cake degradation composition in an amount in the range of from about 1% to about 75% weight of the in-situ filter cake degradation composition. In certain embodiments of the present invention, the delayed-release acid component may be present in the in-situ filter cake degradation composition in an amount in the range of from about 5% to about 20% by weight in the in-situ filter cake degradation composition.

The in-situ filter cake degradation compositions of the present invention generally comprise an initiator component. Examples of suitable initiator components include, inter alia, enzymes such as lactate oxidase, and the like, and derivatives thereof. Generally, the initiator component will be present in the in-situ filter cake degradation compositions of the present invention in an amount sufficient to: (1) delay interaction between the acid released by the delayed-release acid component and the inorganic portion of the filter cake for a desired period of time; and (2) produce a sufficient amount of oxidizer (e.g., a peroxide, such as hydrogen peroxide) when reacting with the acid derivative to ultimately degrade at least a portion of the organic portion of the filter cake. In certain embodiments of the present invention, the initiator component may comprise at least about 0.1% to about 4% by weight of the in-situ filter cake degradation compositions of the present invention. In certain embodiments of the present invention, the initiator component may comprise at least about 0.2% to about 1% by weight of the in-situ filter cake degradation compositions of the present invention. In certain embodiments where an operator desires a long delay before the inorganic portion of the filter cake degrades completely, the operator may elect to increase the amount of the initiator component. However, the particular acid-derivative component of the delayed release acid composition (e.g., lactide), the particular components of the filter cake (e.g., calcium carbonate), and any other components present in the well bore (e.g., other acids) may dictate the appropriate amount to include. Also, the desired delay period for degrading the filter cake should be considered in deciding upon the appropriate relative concentrations of the delayed-release acid component and the initiator component for an in-situ filter cake degradation composition of the present invention. One of ordinary skill in the art, with the benefit of this disclosure, will recognize the appropriate amount of each component to include for a desired application.

Generally, the initiator component of the in-situ filter cake degradation compositions of the present invention interacts with acids present in the well bore (e.g., the acid released by the delayed-release acid component) in such a way as to delay the interaction between at least a portion of the acids and at least a portion of the inorganic portion of the filter cake for a period of time, thereby delaying degradation of the inorganic portion of the filter cake by the acid. Thus, the integrity of the filter cake may not be jeopardized for a given desired delay period. Degradation of only a very small percentage of the inorganic portion of the filter cake (e.g., less than about 2%) may compromise the integrity of the filter cake. As stated earlier, the reaction between the initiator component and the released acid also generates an oxidizer that ultimately may degrade the organic portion of the filter cake. In certain embodiments of the present invention, the oxidizer may be, inter alia, a peroxide, such as hydrogen peroxide. The oxidizer then may interact with the organic portion of the filter cake to ultimately degrade at least a portion of the organic portion of the filter cake. In certain embodiments of the present invention, the reaction between the initiator component and the released acid also may generate pyruvate, which may hydrolyze into pyruvic acid.

Certain embodiments of the in-situ filter cake degradation compositions of the present invention may be used independently of the well drill-in and servicing fluids of the present invention, to degrade a filter cake that has been established in a subterranean formation by, e.g., a fluid other than the well drill-in and servicing fluids of the present invention.

An example of a composition of the present invention is a well drill-in and servicing fluid comprising 78.5% water by weight, 7.9% sodium chloride by weight, 0.2% N-VIS by weight, 1.7% N Dril HT Plus by weight, and 11.7% by weight of an in-situ filter cake degradation composition of the present invention comprising 60% poly(lactic acid) by weight, 38% calcium carbonate by weight, and 2% lactate oxidase by weight. Another example of a composition of the present invention is an in-situ filter cake degradation composition comprising 60% poly(lactic acid) by weight, 38% calcium carbonate by weight, and 2% lactate oxidase by weight.

An example of a method of the present invention is a method for forming a self-degrading filter cake in a subterranean formation, comprising: placing a well drill-in and servicing fluid in a subterranean formation, the well drill-in and servicing fluid comprising a base fluid, a viscosifier, a fluid loss control additive, a bridging agent, and an in-situ filter cake degradation composition comprising a delayed-release acid component and an initiator component; and forming a filter cake upon a surface within the formation. For example, the surface within the formation may be, inter alia, a well bore wall, or a screen, or a gravel pack.

Another example of a method of the present invention is a method of drilling a well bore in a subterranean formation, comprising; using a well drill-in and servicing fluid to drill a well bore in a subterranean formation, the well drill-in and servicing fluid comprising a base fluid, a viscosifier, a fluid loss control additive, a bridging agent, and an in-situ filter cake degradation composition comprising a delayed-release acid component and an initiator component; permitting the well drill-in and servicing fluid to establish a filter cake in at least a portion of the well bore; and permitting the filter cake to degrade. Inter alia, the well drill-in and servicing fluid may, in certain embodiments, be circulated through a drill pipe and drill bit in contact with the subterranean formation.

Another example of a method of the present invention is a method of degrading a filter cake in a subterranean formation, the filter cake comprising an inorganic portion and an organic portion, the method comprising: introducing an in-situ filter cake degradation composition comprising a delayed-release acid component and an initiator component into a well bore in the subterranean formation; allowing the delayed-release acid component to release an acid; allowing the initiator component to interact with the released acid to produce an oxidizer; allowing the released acid to degrade at least a portion of the inorganic portion of the filter cake; and allowing the oxidizer to degrade at least a portion of the organic portion of the filter cake.

Therefore, the present invention is well adapted to carry out the objects and attain the ends and advantages mentioned as well as those that are inherent therein. While the invention has been depicted and described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for forming a self-degrading filter cake in a subterranean formation, comprising:
   placing a well drill-in and servicing fluid in a subterranean formation, the well drill-in and servicing fluid comprising a base fluid, a viscosifier, a fluid loss control additive, a bridging agent, and an in-situ filter cake degradation composition comprising
      at least one delayed-release acid component selected from the group consisting of an ortho ester and a poly(ortho ester), wherein the delayed-release acid component is present in the in-situ filter cake degradation composition in an amount in the range of from about 1% to about 75% by weight, and
      an initiator component present in the in-situ filter cake degradation composition in an amount in the range of from about 0.1% to about 4% by weight; and
   forming a filter cake upon a surface within the formation.

2. The method of claim 1 wherein the base fluid is aqueous-based, nonaqueous-based, or a mixture thereof.

3. The method of claim 2 wherein the nonaqueous-based base fluid comprises at least one component selected from the group consisting of: a mineral oil, a synthetic oil, an ester, and any derivative thereof.

4. The method of claim 1 further comprising permitting the delayed-release acid component to release an acid; and permitting the initiator component to react with the released acid to produce an oxidizer.

5. The method of claim 4 wherein the oxidizer is hydrogen peroxide.

6. The method of claim 1 wherein forming a filter cake upon a surface within the formation comprises forming the filter cake upon the face of the formation itself, upon a sand screen, or upon a gravel pack.

7. The method of claim 1 wherein the base fluid is present in the well drill-in and servicing fluid in an amount in the range of from about 20% to about 99.99% by volume.

8. The method of claim 1 wherein the viscosifier comprises at least viscosifier selected from the group consisting of: a biopolymer, cellulose, a cellulose derivative, guar, and any guar derivative.

9. The method of claim 1 wherein the viscosifier is present in the well drill-in and servicing fluid in an amount sufficient to provide a desired degree of solids suspension.

10. The method of claim 1 wherein the viscosifier is present in the well drill-in and servicing fluid in an amount in the range of from about 0.2% to about 0.6% by weight.

11. The method of claim 1 wherein the fluid loss control additive is present in the well drill-in and servicing fluid in an amount sufficient to provide a desired degree of fluid loss control.

12. The method of claim 1 wherein the fluid loss control additive is present in the well drill-in and servicing fluid in an amount in the range of from about 0.01% to about 3% by weight.

13. The method of claim 1 wherein the bridging agent comprises at least one of the following: calcium carbonate, a magnesium compound, a chemically bonded ceramic bridging agent, or a derivative thereof.

14. The method of claim 1 wherein the bridging agent is present in the well drill-in and servicing fluid in an amount sufficient to create an efficient filter cake.

15. The method of claim 1 wherein the bridging agent is present in the well drill-in and servicing fluid in an amount in the range of from about 0.1% to about 32% by weight.

16. The method of claim 1 wherein the in-situ filter cake degradation composition is present in the well-drill in and servicing fluid in an amount sufficient to remove, to a desired degree, a filter cake that has been established in a subterranean formation by the well drill-in and servicing fluid.

17. The method of claim 1 wherein the in-situ filter cake degradation composition is present in the well drill-in and servicing fluid in an amount in the range of from about 10% to about 25% by weight of the well drill-in and servicing fluid.

18. The method of claim 1 wherein the delayed-release acid component further comprises at least one component selected from the group consisting of: an ester; an aliphatic polyester; a lactide; a poly(lactide); a glycolide; a poly(glycolide); a lactone; a poly($\epsilon$-caprolactone); a poly(hydroxybutyrate); an anhydride; a poly(anhydride); a poly(amino acid); an esterase enzyme; and any derivative thereof.

19. The method of claim 1 wherein the delayed-release acid component comprises a blend of poly(lactic acid) and an ortho ester.

20. The method of claim 1 wherein the initiator component comprises lactate oxidase, or a derivative thereof.

21. The method of claim 1 wherein the initiator component comprises lactate oxidase, or a derivative thereof.

22. The method of claim 1 wherein the initiator component comprises lactate oxidase, the delayed-release acid component further comprises poly(lactic acid), and the method further comprises:
   permitting the poly(lactic acid) to release lactic acid; and
   permitting the lactate oxidase to react with the lactic acid to produce an oxidizer.

23. A method of drilling a well bore in a subterranean formation, comprising:
   using a well drill-in and servicing fluid to drill a well bore in a subterranean formation, the well drill-in and servicing fluid comprising a base fluid, a viscosifier, a fluid loss control additive, a bridging agent, and an in-situ filter cake degradation composition comprising
      at least one delayed-release acid component selected from the group consisting of an ortho ester and a poly(ortho ester), wherein the delayed-release acid component is present in the in-situ filter cake degradation composition in an amount in the range of from about 1% to about 75% by weight, and
      an initiator component present in the in-situ filter cake degradation composition in an amount in the range of from about 0.1% to about 4% by weight;
   permitting the well drill-in and servicing fluid to establish a filter cake in at least a portion of the well bore; and
   permitting the filter cake to degrade.

24. The method of claim 23 wherein the base fluid is aqueous-based, nonaqueous-based, or a mixture thereof.

25. The method of claim 24 wherein the nonaqueous-based base fluid comprises at least one component selected from the group consisting of: a mineral oil, a synthetic oil, an ester, and any derivative thereof.

26. The method of claim 23 wherein permitting the filter cake to degrade comprises:
allowing the delayed-release acid component to release an acid;
allowing the initiator component to interact with the released acid to produce an oxidizer;
allowing the released acid to degrade at least a portion of the inorganic portion of the filter cake; and
allowing the oxidizer to degrade at least a portion of the organic portion of the filter cake.

27. The method of claim 26 wherein the oxidizer is hydrogen peroxide.

28. The method of claim 23 wherein forming a filter cake upon a surface within the formation comprises forming the filter cake upon the face of the formation itself, upon a sand screen, or upon a gravel pack.

29. The method of claim 23 wherein the viscosifier comprises at least viscosifier selected from the group consisting of: a biopolymer, cellulose, a cellulose derivative, guar, and any guar derivative.

30. The method of claim 23 wherein the bridging agent comprises at least component selected from the group consisting of: calcium carbonate, a magnesium compound, a chemically bonded ceramic bridging agent, and any derivative thereof.

31. The method of claim 23 wherein the bridging agent is present in the well drill-in and servicing fluid in an amount in the range of from about 0.1% to about 32% by weight.

32. The method of claim 23 wherein the in-situ filter cake degradation composition is present in the well drill-in and servicing fluid in an amount in the range of from about 10% to about 25% by weight of the well drill-in and servicing fluid.

33. The method of claim 23 wherein the delayed-release acid component further comprises at least one component selected from the group consisting of: an ester; an aliphatic polyester; a lactide; a poly(lactide); a glycolide; a poly(glycolide); a lactone; a poly(ε-caprolactone); a poly(hydroxybutyrate); an anhydride; a poly(anhydride); a poly(amino acid); an esterase enzyme; and any derivative thereof.

34. The method of claim 23 wherein the delayed-release acid component comprises a blend of poly(lactic acid) and an ortho ester.

35. The method of claim 23 wherein the initiator component comprises lactate oxidase, or a derivative thereof.

36. The method of claim 23 wherein the initiator component comprises lactate oxidase, or a derivative thereof.

37. The method of claim 23 wherein the step of using a well drill-in and servicing fluid to drill a well bore in a subterranean formation comprises circulating the well drill-in and servicing fluid through a drill pipe and drill bit in contact with the subterranean formation.

38. The method of claim 23 wherein the initiator component comprises lactate oxidase, the delayed-release acid component further comprises poly(lactic acid), and permitting the filter cake to degrade comprises:
allowing the poly(lactic acid) to release lactic acid;
allowing the lactate oxidase to interact with the lactic acid to produce an oxidizer;
allowing the lactic acid to degrade at least a portion of the inorganic portion of the filter cake; and
allowing the oxidizer to degrade at least a portion of the organic portion of the filter cake.

39. A method of degrading a filter cake in a subterranean formation, the filter cake comprising an inorganic portion and an organic portion, the method comprising:
introducing an in-situ filter cake degradation composition comprising
at least one delayed-release acid component selected from the group consisting of an ortho ester and a poly(ortho ester), wherein the delayed-release acid component is present in the in-situ filter cake degradation composition in an amount in the range of from about 1% to about 75% by weight, and
an initiator component present in the in-situ filter cake degradation composition in an amount in the range of from about 0.1% to about 4% by weight into a well bore in the subterranean formation;
allowing the delayed-release acid component to release an acid;
allowing the initiator component to interact with the released acid to produce an oxidizer;
allowing the released acid to degrade at least a portion of the inorganic portion of the filter cake; and
allowing the oxidizer to degrade at least a portion of the organic portion of the filter cake.

40. The method of claim 39 wherein the inorganic portion of the filter cake comprises at least one component selected from the group consisting of: calcium carbonate, a chemically bonded ceramic bridging agent, a magnesium compound, and any derivative thereof.

41. The method of claim 39 wherein the organic portion of the filter cake comprises at least one component selected from the group consisting of: a biopolymer, cellulose, a cellulose derivative, guar, a guar derivative, starch, a starch ether derivative, and any mixture thereof.

42. The method of claim 39 wherein the initiator component comprises lactate oxidase, or a derivative thereof.

43. The method of claim 39 wherein the delayed-release acid component further comprises at least one component selected from the group consisting of: an ester; an aliphatic polyester; a lactide; a poly(lactide); a glycolide; a poly(glycolide); a lactone; a poly(ε-caprolactone); a poly(hydroxybutyrate); an anhydride; a poly(anhydride); a poly(amino acid); and any derivative thereof.

44. The method of claim 39 wherein the delayed-release acid component further comprises an esterase enzyme, or a derivative thereof.

45. The method of claim 39 wherein the delayed-release acid component further comprises a poly(lactic acid).

46. The method of claim 39 wherein the filter cake is formed from a well drill-in and servicing fluid.

47. The method of claim 39 wherein the initiator component comprises lactate oxidase, or a derivative thereof, the delayed-release acid component further comprises poly(lactic acid), and the released acid comprises lactic acid.

* * * * *